United States Patent [19]
Nakatani

[11] Patent Number: 4,718,712
[45] Date of Patent: * Jan. 12, 1988

[54] FRONT STRUCTURE OF VEHICLE BODY

[75] Inventor: Shirou Nakatani, Hiroshima, Japan

[73] Assignee: Mazda Motor Corporation, Japan

[*] Notice: The portion of the term of this patent subsequent to Jan. 12, 2005 has been disclaimed.

[21] Appl. No.: 850,136

[22] Filed: Apr. 10, 1986

[30] Foreign Application Priority Data

Apr. 12, 1985 [JP] Japan .................. 60-78687

[51] Int. Cl.⁴ .................. B62D 25/08; B62D 25/14
[52] U.S. Cl. .................. 296/192; 296/189; 296/84 A
[58] Field of Search .................. 296/84 R, 84 A, 84 D, 296/29, 189, 192–194; 98/2.07, 2.08, 2.16, 2.17; 15/250.16, 250.19

[56] References Cited

U.S. PATENT DOCUMENTS

| | | | |
|---|---|---|---|
| 1,789,109 | 1/1931 | Moesta | 296/192 |
| 1,976,276 | 10/1934 | Aune | 98/2.08 |
| 3,421,174 | 1/1969 | Reese | 15/250.19 |
| 3,719,245 | 3/1973 | Wilfert | 296/84 R X |
| 4,283,085 | 8/1981 | Sacco et al. | 296/84 R |
| 4,406,343 | 9/1983 | Harasaki | 296/194 X |
| 4,542,934 | 9/1985 | Komatsu et al. | 296/194 |
| 4,563,942 | 1/1986 | Grimm et al. | 98/2.07 X |
| 4,618,181 | 10/1986 | Tokuda et al. | 296/191 |
| 4,646,863 | 3/1987 | Yamada | 180/68.1 |

FOREIGN PATENT DOCUMENTS

| | | | |
|---|---|---|---|
| 961471 | 5/1950 | France | 296/84 R |
| 56-168441 | 5/1981 | Japan | |
| 7767 | 1/1982 | Japan | 296/192 |
| 11174 | 1/1982 | Japan | 296/192 |
| 57-19736 | 8/1982 | Japan | |
| 59-11976 | 1/1984 | Japan | 296/194 |

Primary Examiner—Dennis H. Pedder
Attorney, Agent, or Firm—Gerald J. Ferguson, Jr.; Michael P. Hoffman; Michael J. Foycik, Jr.

[57] ABSTRACT

In a front structure of a vehicle body having a cowl box, the cowl box is formed by a closed cross-section windshield holding member for holding the windshield, a front cowl plate and a dashboard upper panel. The front cowl plate defines the front face of the cowl box and the dashboard upper panel defines the bottom and the rear face of the same. The windshield holding member and the dashboard upper panel separate upon vehicle impact and resultant cowl box deformation such that the windshield and holding member remain engaged.

9 Claims, 6 Drawing Figures

FRONT STRUCTURE OF VEHICLE BODY

BACKGROUND OF THE INVENTION

1. Field of the Invention

This invention relates to a front structure of a vehicle body, and more particularly to a front structure of a vehicle body having a cowl box under the windshield.

2. Description of the Prior Art

As described in Japanese Unexamined Utility Model Publication No. 56(1981)-168441, there has been known a front structure of a vehicle body in which a cowl box is provided to extend in the direction of the width of the vehicle body along the lower edge of the windshield. That is, as shown in FIG. 6, a dashboard upper panel C and a front cowl plate D are disposed below the space between the lower edge of the windshield A and the rear edge of the hood B to extend in the direction of the width of the vehicle body. The dashboard upper panel C and the front cowl plate D define a cowl box G separated from both the passenger compartment E and the engine compartment F. The cowl box G is generally provided to ensure a vehicle body rigidity and/or to introduce the fresh air into the passenger compartment. Conventionally, the dashboard upper panel C, which defines the bottom and the rear face of the cowl box G, and the front cowl plate D, which defines the front face and the top face of the same, are fixed together such as by spot welding, for instance, flange portions C1 and C2 respectively formed on the front and rear portions of the panel C to the flange portions D1 and D2 respectively formed on the front and rear portions of the plate D. A weather strip H is mounted on the rear junction of the panel C and the plate D, i.e., the flange portions C2 and D2, and the lower edge of the windshield A is engaged with the weather strip H so that the windshield A is supported by the cowl box G.

However, this structure is disadvantageous in that when a collision forces the engine rearward, pushing the cowl box G toward the passenger compartment E, there is a possibility that the portion of the cowl box G supporting the windshield A will be deformed or the lower edge of the windshield A disengaged therefrom, thereby breaking the windshield A. This is undesirable in terms of passenger safety.

SUMMARY OF THE INVENTION

In view of the foregoing observations and description, the primary object of the present invention is to provide an improved front structure of a vehicle body having a cowl box in which breakage of the windshield due to deformation or displacement of the cowl box upon collision can be prevented, thereby providing improved passenger safety.

In accordance with the present invention, the cowl box is formed by a windshield holding member for holding the windshield, a front cowl plate and a dashboard upper panel, the front cowl plate defining the front face of the cowl box and the dashboard upper panel defining the bottom and the rear face of the same, and the junction of the windshield holding member with the dashboard upper panel is more fragile than the other junctions. The windshield holding member and the dashboard upper panel may be fixed to each other by bolts or spot welding, for instance. In the case that the windshield holding member and the dashboard upper panel are fixed by bolts passed through bolt holes in the windshield holding member and the dashboard upper panel, the junction therebetween can be made more fragile than the other junctions by, for instance, cutting a part of the wall defining the bolt holes of the windshield holding member or the dashboard upper panel so that the bolts can be dislodged from the bolt holes. In the case that the windshield holding member and the dashboard upper panel are fixed by spot welding, the junction therebetween can be made more fragile by, for instance, welding together the windshield holding member and the dashboard upper panel at spots spread thinner than in the other junctions between other portions of the cowl box.

With the arrangement described above, the dashboard upper panel is dislodged from the windshield holding member when a collision forces the engine rearward, pushing the cowl box toward the passenger compartment, with the windshield holding member remaining in the original position. Breakage of the windshield due to deformation or displacement of the cowl box upon collision can be prevented, eliminating the risk of the passenger being hurt by windshield fragments.

BRIEF DESCRIPTION OF THE DRAWINGS

FIG. 6 is a fragmentary cross-sectional view showing a front structure for a vehicle in accordance with the prior art.

DESCRIPTION OF THE PREFERRED EMBODIMENTS

Figure 1:
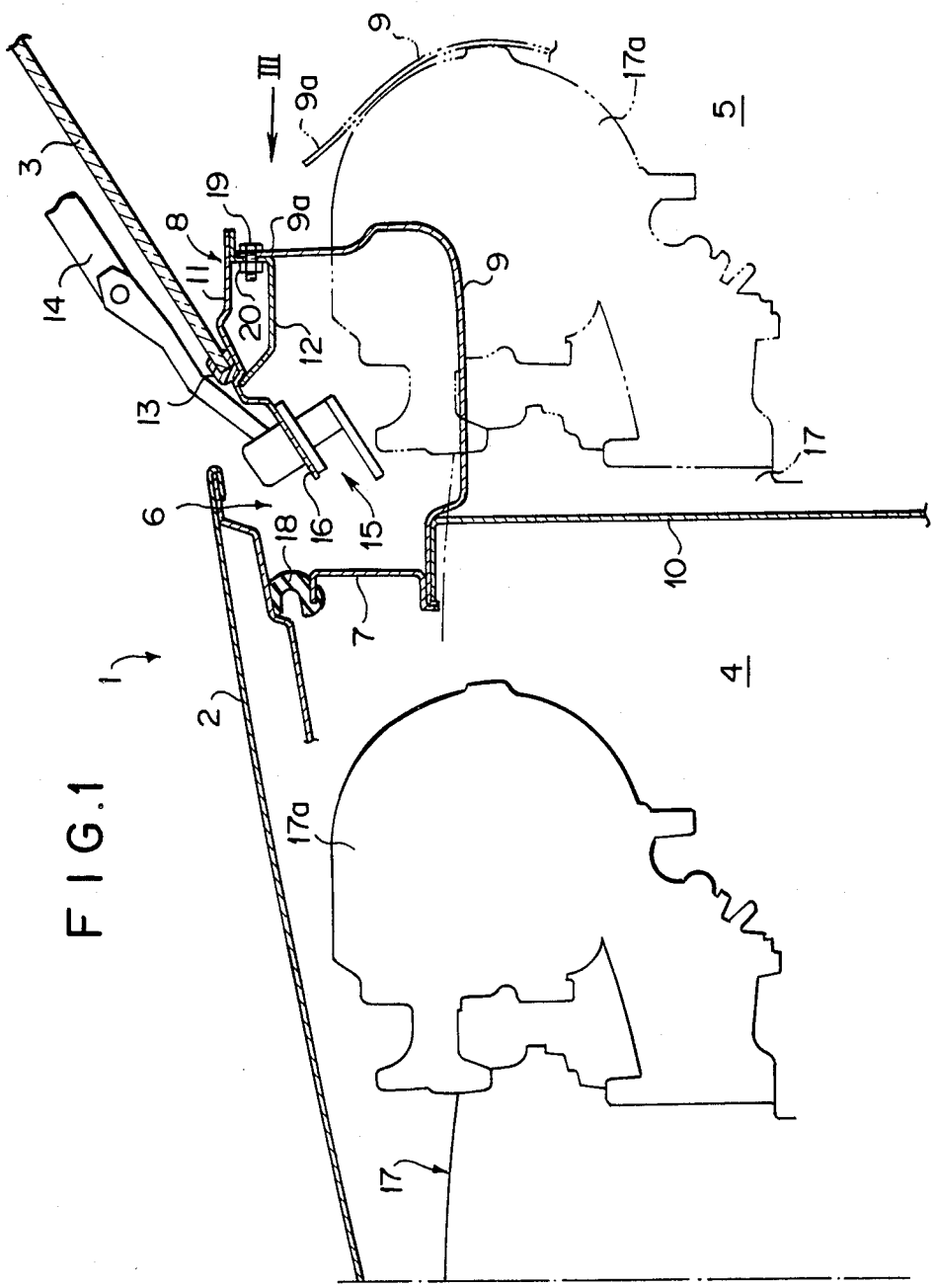
FIG. 1 is a schematic cross-sectional view of a front structure of a vehicle body in accordance with a first embodiment of the present invention.
Figure 2:
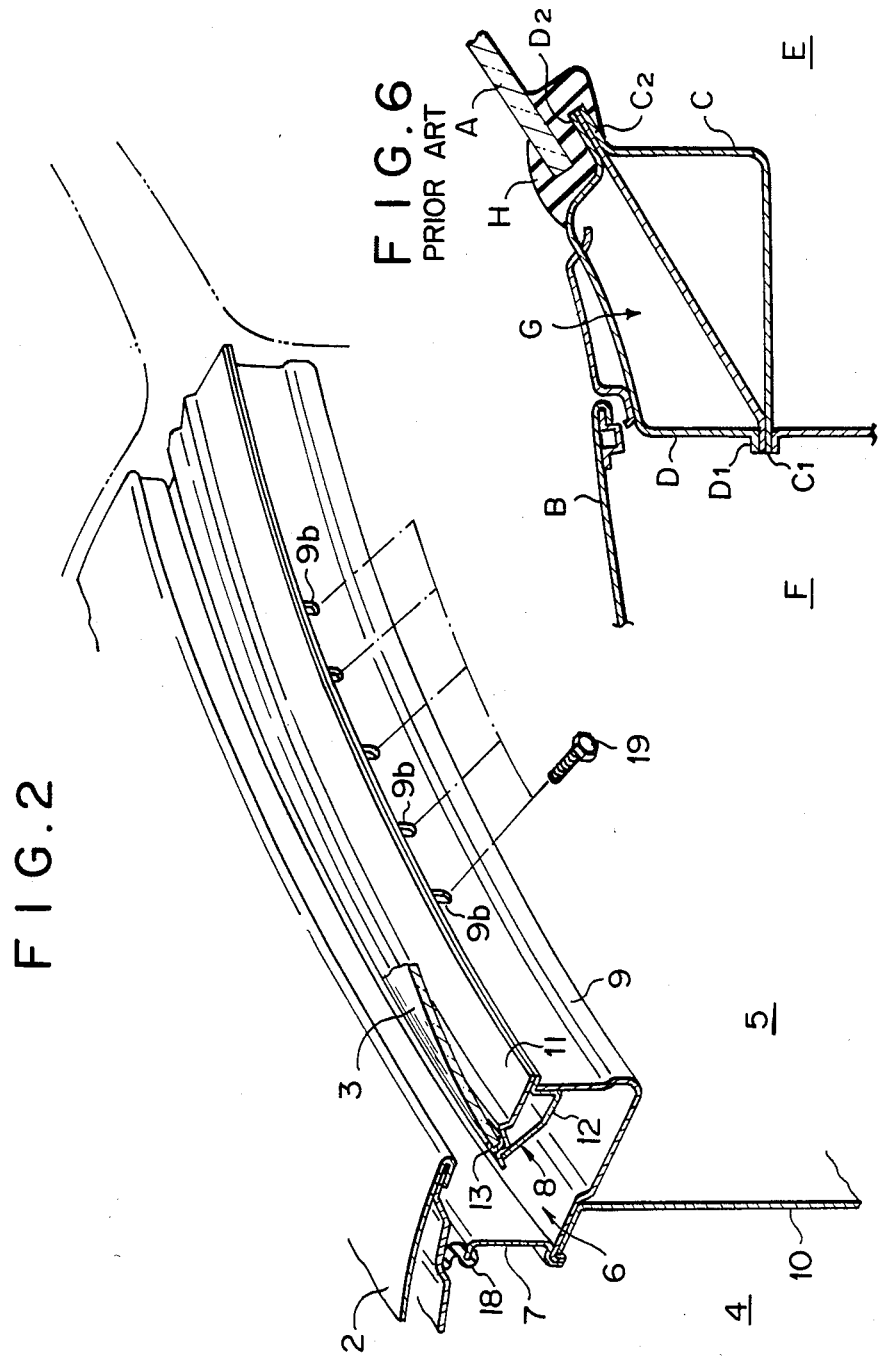
FIG. 2 is a schematic perspective view showing the cowl box and the part associated therewith employed in the front structure of the first embodiment.

In FIGS. 1 and 2, a vehicle 1 is provided with a cowl box 6 formed below the space between the rear edge of a hood 2 and the lower edge of a windshield 3. The cowl box 6 is separated from an engine compartment 4 and a passenger compartment 5. The cowl box 6 comprises a front cowl plate 7 which extends in the direction of the width of the vehicle body and forms the front face of the cowl box 6, a windshield holding member 8 provided to form an upper part of the cowl box 6 and to support the windshield 3, and dashboard upper panel 9 which is fixed to the front cowl plate 7 and the windshield holding member 8 respectively at the front edge and the upper edge thereof and forms the bottom face and the rear face of the cowl box 6. A dashboard lower panel 10 for separating the engine compartment 4 from the passenger compartment 5 is fixed to the lower surface of the front edge portion of the dashboard upper panel 9. The windshield holding member 8 comprises an upper member 11 and a lower member 12 fixed together relatively strongly by, for instance, spot welding to form a closed cross section in the direction of the width of the vehicle body. The upper surface of the front edge portion of the windshield holding member 8 is fixed to the lower edge portion of the windshield 3 by adhesive 13 to hold the windshield 3.

A link mechanism 15 (partly shown in FIG. 1) for driving a windshield wiper 14 is housed in the cowl box 6. The link mechanism 15 is supported on the windshield holding member 8 by way of a bracket 16 mounted thereon, and is driven by an electric motor (not shown). In this particular embodiment, an engine 17 having a surge tank 17a on the rear side thereof is provided in the engine compartment 4, and a seal member 18 for sealing the space between the hood 2 and the front cowl plate 7 is mounted on the upper edge of the front cowl plate 7.

Figure 3:
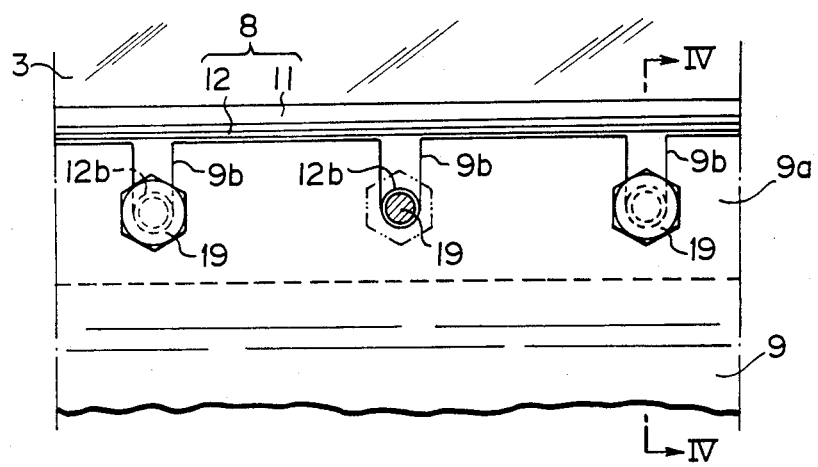
FIG. 3 is an enlarged partial view as seen from arrow III in FIG. 1.
Figure 4:
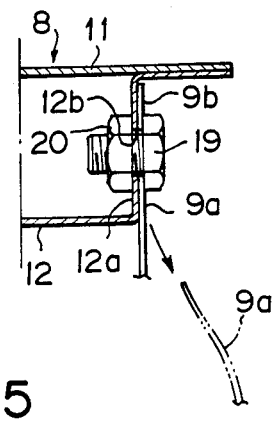
FIG. 4 is a cross-sectional view along line IV—IV of FIG. 3.

The windshield holding member 8 and the dashboard upper panel 9 are fixed together by a plurality of bolts 19 more fragilely than other junctions, e.g., the junction of the front cowl plate 7 and the dashboard upper panel 9. That is, as shown in an enlarged scale in FIGS. 3 and 4, the rear face 12a of the lower member 12 of the windshield holding member 8 is provided with a plurality of bolt insertion portions 12b and the upper edge portion 9a of the dashboard upper panel 9 is provided with a plurality of bolt insertion portions 9b. The bolt insertion portions 12b and 9b are the same in number and each of the bolt insertion portions 12b of the lower member 12 is aligned with one of the bolt insertion portions 9b of the dashboard upper panel 9. The bolts 19 are inserted into the aligned bolt insertion portions 12b and 9b and a plurality of nuts 20 are screwed on the bolts 19 from behind the rear face 12a of the lower member 12. By tightening the bolts 19, the windshield holding member 8 and the dashboard upper panel 9 are fixed together. Each of the bolt insertion portions 12b is in the form of an opening. On the other hand, each of the bolt insertion portions 9b of the dashboard upper panel 9 is in the form of an open slot an end of which opens at the upper edge of the dashboard upper panel 9. Thus, the junction of the windshield holding member 8 and the dashboard upper panel 9 is relatively fragile. That is, when the dashboard upper panel 9 is pushed toward the passenger compartment 5 by the engine 17 by a collision, the bolts 19 are dislodged from the bolt insertion portions 9b of the dashboard upper panel 9 and the dashboard upper panel 9 is separated from the windshield holding member 8.

With this arrangement, when upon collision the engine 17 is moved into the passenger compartment 5 as shown by the chained line in FIG. 1, the front cowl plate 7, the dashboard lower panel 10 and the dashboard upper panel 9 are deformed by the engine 17 (the surge tank 17a in this particular embodiment) toward the passenger compartment 5. However, the windshield holding member 8 remains in the original position, dislodged from the dashboard upper panel 9 since the windshield holding member 8 and the dashboard upper panel 9 are fixed together relatively fragilely. That is, when the dashboard upper panel 9 is pushed toward the passenger compartment 5, the upper edge portion 9a of the dashboard upper panel 9 is pulled downwardly as shown by the chained line in FIGS. 1 and 4. Accordingly, the upper edge portion 9a is dislodged from the bolts 19 since the bolt insertion portions 9b are open at the upper edge thereof.

Since the windshield holding member 8 can remain in the original position even if the dashboard upper panel 9 is displaced toward the passenger compartment 5, deformation of the windshield holding member 8 or removal of the windshield 3 from the windshield holding member 8 can be avoided and, accordingly, the windshield 3 can be prevented from being broken.

Though, in the first embodiment, the windshield holding member 8 and the dashboard upper panel 9 are fixed together relatively fragilely by using open slots as the bolt insertion portions 9b of the dashboard upper panel 9 so that the windshield holding member 8 is dislodged from the dashboard upper panel with the bolts 19 and the nuts 20 held by the windshield holding member 8, the bolt insertion portions 12b of the windshield holding member 8 may instead be in the form of open slots with the bolt insertion portions 9b of the dashboard upper panel 9 being in the form of openings so that the windshield holding member is dislodged from the dashboard upper panel 9 with the bolts 19 and the nuts 20 held by the dashboard upper panel 9.

Figure 5:
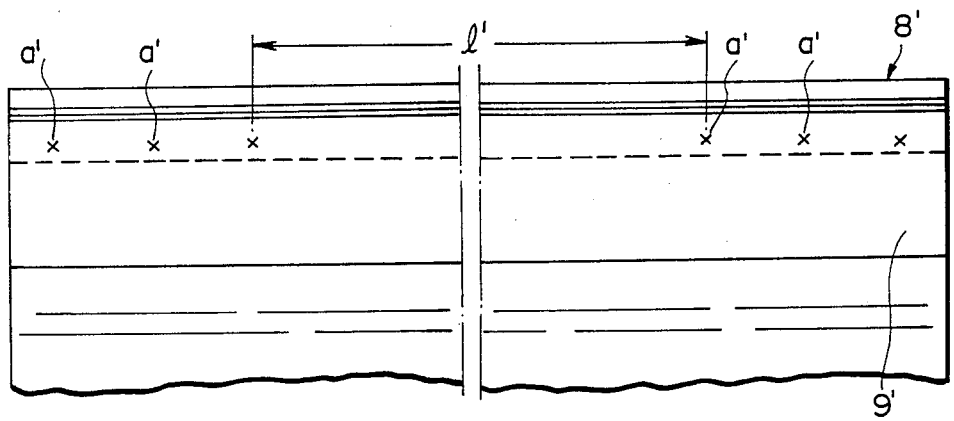
FIG. 5 is an enlarged partial view showing the spot-welded portion of the windshield holding member and the dashboard upper panel in a front structure in accordance with a second embodiment of the present invention.

In the second embodiment shown in FIG. 5, the windshield holding member 8' and the dashboard upper panel 9' are fixed together by spot welding. That is, the windshield holding member 8' and the dashboard upper panel 9' are welded at spots a' and the junction thereof is made relatively fragile by increasing the spot pitch 1' as compared with the other junctions. In this case, it is preferred that the spot pitch 1' be enlarged at a portion at which the windshield holding member 8' is especially apt to be deformed, or a portion at which the engine 17 is apt to be moved toward the passenger compartment 5 (the central portion in the illustrated embodiment).

The windshield holding member and the dashboard upper panel may be fixed together fragilely by a seal member formed of, for instance, adhesive instead of using bolts or spot welding. Further, it is possible to fix the windshield holding member to the dashboard upper panel more fragilely than is the case with other junctions by a combination of these bonding methods.

I claim:

1. A front structure for a vehicle body having a cowl box extending along a lower edge of a windshield, the cowl box being formed by a closed cross section windshield holding member for holding the windshield, comprising: a front cowl plate and a dashboard upper panel fixed to the windshield holding member at a junction, the front cowl plate defining a front face of the cowl box and the dashboard upper panel defining a bottom and a rear face of the cowl box, and wherein the windshield holding member and the dashboard upper panel separate upon vehicle impact and resultant cowl box deformation such that the windshield and holding member remain engaged.

2. A front structure as defined in claim 1 in which said windshield holding member and the dashboard upper panel are fixed to each other by bolts.

3. A front structure as defined in claim 2 in which said windshield holding member and the dashboard upper panel are fixed by bolts passed through bolt insertion portions in the windshield holding member and the dashboard upper panel, and the junction thereof is made more fragile than the other junctions by cutting a part of a wall defining the bolt insertion portions of one of the windshield holding member and the dashboard upper panel so that at least one of the bolt insertion portions of the windshield holding member and of the dashboard upper panels can be dislodged from the bolts.

4. A front structure as defined in claim 3 in which said windshield holding member comprises an upper member and a lower member, and a rear face of the lower member of the windshield holding member is provided with a first plurality of bolt insertion portions and an upper edge portion of the dashboard upper panel is provided with a plurality of second bolt insertion portions, each of the first bolt insertion portions of the lower member is aligned with one of the second bolt insertion portions of the dashboard upper panel, each of the first bolt insertion portions of the lower member being in the form of an opening and each of the second bolt insertions portions being in the form of a slot, an end of which opens at the upper edge of the dashboard upper panel.

5. A front structure as defined in claim 1 in which said windshield holding member and the dashboard upper panel are fixed together by spot welding, and the junction thereof is made more fragile by welding together the windshield holding member and the dashboard upper panel at weld locations having large separations therebetween.

6. A front structure as defined in claim 5 in which said windshield holding member comprises an upper member and a lower member, and the rear face of the lower member is opposed to the upper edge portion of the dashboard upper panel and is fixed thereto.

7. A front structure as defined in claim 6 in which said windshield holding member and the dashboard upper panel are fixed together by spot welding and a normal spacing between the spot welds is increased at portions corresponding to a position in which an engine of the vehicle is apt to be moved into contact with the cowl box upon collision.

8. A front structure as defined in claim 1 in which said windshield holding member and the dashboard upper panel are fixed together by spot welding and a normal spacing between the spot welds is increased at portions corresponding to a position in which an engine of the vehicle is apt to be moved into contact with the cowl box upon collision.

9. A front structure as defined in claim 8 in which said windshield holding member comprises an upper member and a lower member, and the rear face of the lower member is opposed to the upper edge portion of the dashboard upper panel and is fixed thereto.

* * * * *